United States Patent
Dodt et al.

[11] 3,983,789
[45] Oct. 5, 1976

[54] TELESCOPIC PROPS

[75] Inventors: Jurgen Dodt, Menden; Harry Rosenberg, Ludinghausen; Karl-Heinz Pfester, Altlunen, all of Germany

[73] Assignee: Gewerkschaft Eisenhutte Westfalia, Wethmar bei Lunen, Germany

[22] Filed: Jan. 15, 1975

[21] Appl. No.: 541,312

[30] Foreign Application Priority Data
Jan. 28, 1974 Germany............................ 2403852

[52] U.S. Cl.................................... 91/168; 91/412; 91/422; 92/168
[51] Int. Cl.².................... F15B 11/18; F16J 15/18
[58] Field of Search..................... 91/168, 412, 422; 92/168

[56] References Cited
UNITED STATES PATENTS

| | | | |
|---|---|---|---|
| 1,963,286 | 6/1934 | Ballert | 91/168 |
| 3,136,221 | 6/1964 | Walker | 91/168 |

FOREIGN PATENTS OR APPLICATIONS

| | | | |
|---|---|---|---|
| 1,240,743 | 5/1967 | Germany | 91/168 |
| 413,185 | 3/1946 | Italy | 91/168 |

Primary Examiner—Paul E. Maslousky
Attorney, Agent, or Firm—Sughrue, Rothwell, Mion, Zinn and Macpeak

[57] ABSTRACT

A three-stage hydraulically-operated telescopic prop is disclosed having working chambers which can be charged with hydraulic pressure fluid to extend a central prop member relative to an outer prop member and an inner prop member relative to the central member. A pressure-operated spring biased non-return valve is operated by pressure to open communication between the working chambers to extend the inner member once the central member has been fully extended. The valve is also operated mechanically to open communication between the working chambers to allow retraction of the inner member when the central member has been retracted to a certain extent. Further chambers are provided between the central and outer member, and between the central and inner member, and these chambers can be charged with hydraulic pressure fluid to retract the central member relative to the outer member and the inner member relative to the central member. Guide bushings with sealing and/or packing rings are secured to the upper ends of the outer and central members to locate and guide the central and inner members during their movement.

11 Claims, 3 Drawing Figures

TELESCOPIC PROPS

BACKGROUND OF THE INVENTION

The present invention relates to telescopic props which can be extended or retracted hydraulically and which are particularly intended for use in mineral mines.

A known form of telescopic prop is disclosed in German Pat. No. 1,129,911. This known prop has three cylinder members disposed one within another in telescopic manner. The innermost and central or intermediate member has pistons facing working chambers in the outer and central members, respectively. These working chambers are interconnected through a non-return valve so that hydraulic pressure fluid can be admitted in succession to these chambers to extend the central member and then the inner member. In addition annular working chambers are provided between the outermost and central members and between the central and innermost members. The central and innermost members are provided with further piston surfaces facing these annular chambers to retract the inner member and then the central member. Bores are provided in the central member and in the piston of the innermost member so that during retraction the annular chamber between the central and innermost members receives fluid to retract the innermost member into the central member and thereafter communication between the annular chambers is established through the bores to allow fluid to enter the annular chamber between the outermost and central members to effect retraction of the central member into the outermost member.

A general object of the present invention is to provide an improved form of telescopic prop.

A further object is to provide a prop in which the central member is retracted within the outer member before the inner member is retracted within the central member.

Another object is to provide a prop in which the members will not inadvertently extend due to the formation of pressure heads in the working chambers during the retraction operation.

BRIEF SUMMARY OF THE INVENTION

According to the invention there is provided a telescopic prop which can be extended or retracted hydraulically; said prop comprising an outer prop member, an intermediate prop member disposed within said outer member and mounted for longitudinal displacement in relation to said outer member, an inner prop member disposed within said intermediate member and mounted for longitudinal displacement in relation to said intermediate member, a first piston surface formed on the intermediate member, a second piston surface formed on the inner member, a first working chamber disposed between the first piston surface and the interior of the outer member, means for permitting pressure fluid to flow into or out from said first chamber, a second working chamber disposed between the second piston surface and the interior of the intermediate member, a spring-biased non-return valve operably disposed between the first and second working chambers, the valve being adapted to open in a direction from the first chamber to the second chamber when the intermediate member is retracted within the outer member or when the intermediate member is extended from the outer member, a third chamber disposed between the outer and intermediate members, a third piston surface formed on the intermediate member and facing said third chamber, a fourth chamber disposed between the intermediate and inner members, a fourth piston surface formed on the inner member and facing the fourth chamber; means for permitting pressure fluid to flow into or out from said third chamber and at least one bore in the intermediate member which permits communication between the third and fourth chambers when the intermediate member is retracted within the outer member and which permits communication between the fourth chamber and the atmosphere or surroundings when the intermediate member is extended from the outer member, whereby pressure fluid can be admitted into the first and second chambers to act on the first and second piston surfaces, respectively, to thereby extend the intermediate member and the inner member, respectively, and pressure fluid can be admitted into the third and fourth chambers to act on the third and fourth piston surfaces, respectively, to thereby retract the intermediate member and the inner member, respectively.

Preferably, the non-return valve has a valve closure element biased by said spring against a seating; the element being movable off its seating to open the valve to permit pressure fluid to pass between the first and second chambers when the pressure in the first chamber rises to a predetermined value and the element being connected to a stem which can engage on said base plate to move the element off its seating and open the valve when the intermediate member is retracted within the outer member to a predetermined extent.

During extension of the inner prop member, the fluid present in the fourth chamber between the intermediate or central member and the inner member will be ejected through the bore in the intermediate member to the surroundings. During retraction the intermediate member is lowered firstly by admission of fluid into the third chamber and when almost fully retracted the bore in the intermediate member will permit the fluid to enter the fourth chamber from the third chamber to effect retraction of the inner member. Preferably, the bore in the intermediate member is located at the upper end region of the intermediate member and is inclined with the end of the bore at the exterior of the intermediate member being disposed below the end at the interior of the member. In this way fluid will be ejected downwardly to the floor of the mine working when the inner member is extended.

A guide bushing provided with sealing and packing rings which engage on the exterior surface of the intermediate member can be located at the upper end of the outer member. The bore in the intermediate member can locate just beneath the lower end of this guide bushing and in communication with the third chamber when the intermediate member is fully retracted. The lower end region of the guide bushing can be recessed or chamfered to smoothly locate with the bore. It is of course, possible to provide several bores in the intermediate member instead of a single bore.

It is self-evident that sealing means are necessary between the various components of the prop. The seal at the upper zone of the third chamber is particularly vulnerable to wear since the bore in the intermediate member must pass over this seal to open and close communication between the third and fourth chambers and to open and close communication between the fourth chamber and the surroundings.

To preclude this difficulty the guide bushing may have at least sealing ring and a wear resistant packing ring engaging on the exterior surface of the intermediate member, the packing ring being located axially inwardly of the sealing ring or of the sealing region of said ring relative to said intermediate member.

A resilient O-ring or part of the sealing itself may urge the packing ring against the exterior of the intermediate member. In the latter case, the sealing ring which may be wholly resilient preferably has a recess which receives the packing ring which is naturally somewhat smaller than the sealing ring. The sealing ring may then have a sealing bead or protruberance which engages on the exterior of the intermediate member. While the sealing ring is intended to provide good sealing the packing ring is intended less for sealing and more for taking up the free radial movement or play between the outer and intermediate members to inhibit the sealing ring from wearing too quickly.

A further guide bushing is preferably also provided at the upper end of the intermediate member and has sealing rings engaging on the inner member. The guide bushings can be conveniently in screw threaded engagement with their associated prop members to enable their detachment and further sealing rings can engage between the bushings and their associated members.

The invention may be understood more readily and various other features of the invention may become more apparent from consideration of the following description.

BRIEF DESCRIPTION OF DRAWINGS

An embodiment of the invention will now be described, by way of example only, with reference to the accompanying drawings wherein.

DESCRIPTION OF PREFERRED EMBODIMENT

Figure 1:
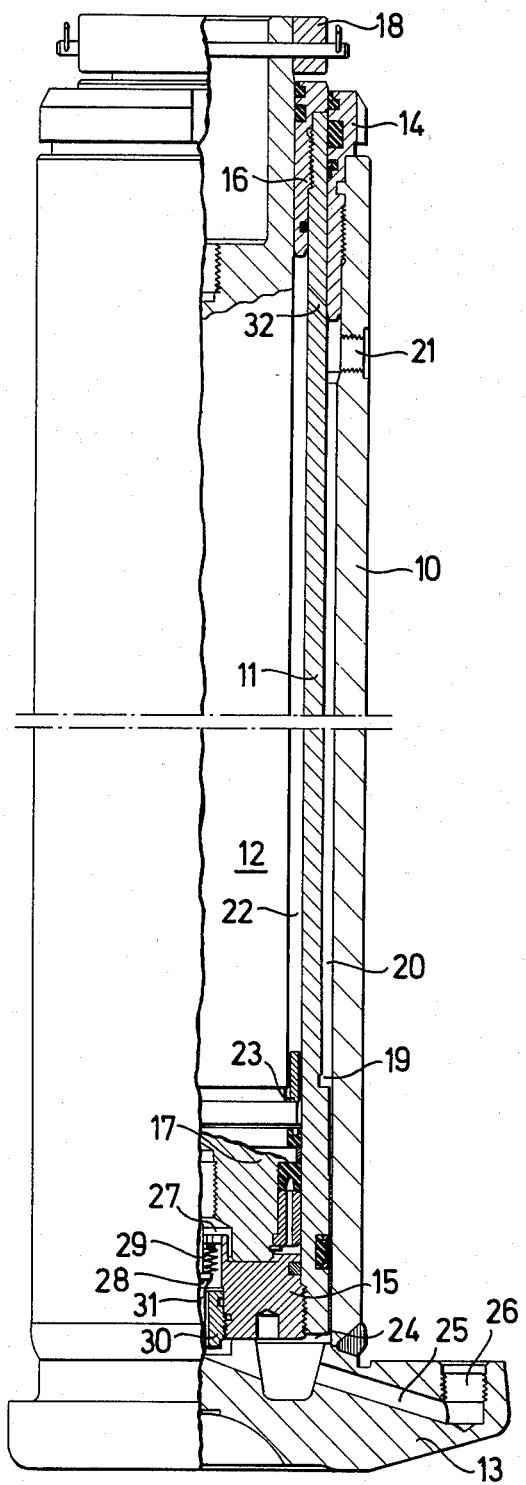
FIG. 1 is a part-sectional side elevation of an hydraulic prop made in accordance with the invention.
Figure 2:
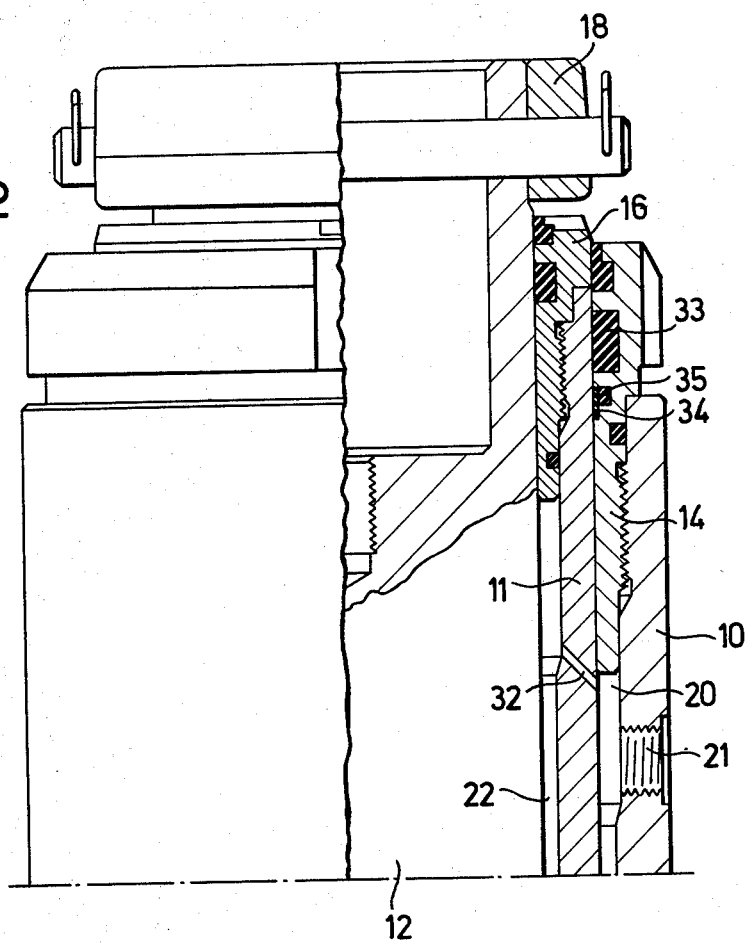
FIG. 2 is a part-sectional side elevation of the upper region of the prop on a somewhat enlarged scale.

As shown in FIGS. 1 and 2, an hydraulic prop is composed in known manner of three cylindrical members arranged one within another in telescopic manner. More particularly, there is an outer member 10, a central or intermediate member 11 arranged within the outer member 10 and an inner member 12 arranged within the central member 11. The members 10, 11, 12 are guided for longitudinal movement in respect of one another and in known manner hydraulic pressure fluid can be admitted into the prop to act on piston surfaces of the members 11, 12 to thereby cause the entire prop to extend.

The outer member 10 has a foot or base plate 13 affixed, as by welding, to its lower end and this plate 13 serves to rest on the floor of a mine working during use. The upper end of the member 10 carries a guide bushing 14. An upper inner portion of the member 10 and the bushing 14 have inter-engaging screw threads permitting the bushing 14 to be removed from the member 10 if desired. The guide bushings 14 has a number of seals or packings on its inner peripheral surface which slidably engage on the outer surface of the member 11.

In a similar manner the upper end of the member 11 also carries a guide bushing 16 which is again in screw-threaded location with the member 11. The bushing 16 also has seals or packings on its inner peripheral surface which slidably engage on the outer surface of the member 12.

Referring now to FIG. 2, the guide bushing 14 has longitudinally spaced-apart grooves in its inner and outer surfaces which receive the aforesaid seals or packings. More particularly, a seal 33 is located in a central annular groove on the inner surface of the bushing 14 and a wear-resistant packing ring 34 is located in a recessed portion of an inner annular groove on the inner surface. This inner groove also locates a resilient O-ring 35 which serves to urge the ring 34 against the exterior surface of the member 11. The packing ring 34 can be made from a suitable plastics or metallic material. The rings 34, 35 serve primarily to protect the seal 33 from undue wear. Further seals or packings are located in an outer annular groove on the inner surface of the bushing 14 and in a further annular groove on the outer surface of the bushing 14. The latter seal or packing engages on the inner surface of the member 10 whereas the seal or packing in the outer groove of the inner surface locates at least partially on the exterior surface of the bushing 16 when the member 12 is retracted into the member 11 as shown. The bushing 16 also has seals or packings located in two annular grooves in its inner surface and in an annular groove in its outer surface.

Figure 3:
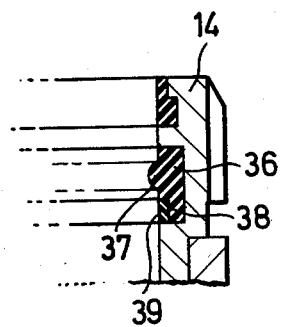
FIG. 3 is a detail view of an alternative form of sealing arrangement which may be employed in the prop.

Instead of employing the arrangement of grooves, seals and packings for the bushing 14 as shown in FIG. 2 an alternative arrangement shown in FIG. 3 can be used. As shown in FIG. 3 the inner surface of the bushing 14 has two longitudinally spaced-apart annular grooves. The innermost larger groove receives a shaped resilient sealing ring 36 made from rubber or plastics material which has a protruberance 37 which seals against the outer surface of the member 12. The ring 36 has a recessed portion 38 at its lower end which receives a wear resistant packing ring 39 which performs the same function as the ring 34 in the FIG. 2 arrangement. The ring 39 is urged against the outer surface of the member 12 by the resilience of the parent ring 34 and the ring 39 can be fixed to the ring 36 if desired.

The lower end of the member 11 is provided with a piston 15 and the piston 15 can be screwed into the member 11. Similarly the lower end of the member 12 is provided with a detachable piston 17 screwed into the member 12. Seals or packings are provided between the pistons 15, 17 and the members 11,12 respectively.

The upper end of the member 12 is provided with a connecting device 18 which serves to secure a roof bar or cap to the prop.

A chamber 24 is located between the working surface of the piston 15 and the base plate 13 and generally within the member 10. A bore 25 in the base plate 13 communicates with the chamber 24 and leads to a further threaded bore 26 which can receive a connector which in turn can be connected to a hydraulic pressure fluid supply or return conduit. The piston 17 has a recess at its centre which partly defines a chamber 27 between the working surface of the piston 17 and the upper inner face of the piston 15 and generally within the member 11. The piston 15 has a through bore at its centre which extends between the chambers 24, 27 and a non-return valve is disposed in this bore. The valve has a valve closure element 28 which is urged by means of a spring 29 against a valve seating formed by a bushing 30 which is in screw threaded engagement with the bore in the piston 15. The element 28 has a stem 31 which extends through the bushing 30 and is engageable with an upper face of the base plate 13.

The member 11 has a portion of enlarged diameter at its lower end adjacent the piston 15 and this portion is provided with a seal which engages on the inner surface of the member 10. A chamber 20 is formed between the inner surface of the member 10 and the outer surface of the member 11. This chamber 20 is limited at the lower end by a shoulder 19 formed by the enlarged portion of the member 11 and at the upper end by the guide bushing 14.

The shoulder 19 constitutes a further piston working surface and a threaded bore 21 is provided in the wall of the member 10 to allow communication with the chamber 20. Hydraulic pressure fluid can be introduced into the chamber 20 or removed therefrom via a connector which is received in the bore 21. The connector can be connected to a pressure fluid supply or return conduit. The fluid admitted to the chamber 20 can then act on the working surface of the shoulder 19 to force the member 11 into the member 10 and towards the base plate 13. In a similar manner a chamber 22 is formed between the inner surface of the member 11 and the outer surface of the member 12. The lower end of the member 12 is provided with one or more attachments which increase the diameter of the member 12 over this lower region and which provide a piston working surface 23 open to the chamber 22. The chamber 22 is limited at the upper end by the guide bushing 16. A bore 32 having an axis inclined in relation to the horizontal and to a diametric plane through the member 11 is provided in the wall of the member 11. The bore 32 has its outer end, i.e., the end at the outer surface of the member 11, below the inner end, i.e., the end at the inner surface of the member 11. Hydraulic fluid can be introduced into the chamber 22 via the bore 32 and can then act on the piston surface 23 at the lower region of the member 12 to cause the member 12 to move into the member 11 and towards the base plate 13. Instead of a single inclined bore 32 a number of such bores can be provided in the wall of the member 11. The lower end region of the bushing 14 can be recessed or chamfered to provide a smooth transition for the bore 32 as the member 11 is retracted.

The operation of the prop is as follows: Assuming that the prop is fully retracted and it is desired to extend and set the prop, the connector in the bore 21 is connected to the return conduit and the connector in the bore 26 is connected to the supply conduit. Hydraulic pressure fluid is introduced into the chamber 24 via the bore 25. The valve closure element 28 is urged against its seating by the spring 29 so that there is no connection between the chambers 24, 27. The fluid acts on the piston 15 and the members 11, 12 move upwardly. Any fluid present in the chamber 20 is expelled through the bore 21 to the hydraulic fluid return conduit. The upward movement of the member 11 ceases when the piston surface 19 engages on the lower end of the bushing 14. The pressure now increases in the chamber 24 until the closure element 28 moves off its seating compressing the spring 29. The fluid can now pass into the chamber 27 to act on the piston 17. The member 12 now extends upwardly. The bore 32 passes over the seals or packings in the bushing 14 as the member 11 is extended and when the member 12 extends the bore 32 is disposed above the guide bushing 14 and is open to the exterior. Consequently as the member 12 moves upwardly any fluid in the chamber 22 is expelled through the bore 32. The movements of the member 12 ceases when the roof cap or bar engages on the roof. The setting pressure for the prop new builds up in the chamber 27 and the spring 29 moves the closure element 28 back onto its seating.

When it is desired to retract the prop, the connector in the bore 21 is connected to the supply conduit and the connector in the bore 26 is connected to the return conduit. Hydraulic fluid now enters the chamber 20 and acts on the piston surface 19 to urge the members 11, 12 downwardly. The fluid in the chamber 24 is expelled through the bore 25 into the return conduit. Although the pressure may rise in the chamber 24 the valve is designed not to open even with maximum back pressure. However, when the member 11 is almost fully retracted and as the piston 15 approaches the upper face of the base plate 13 the stem 31 engages on the face to lift the closure element 28 off its seating. When the valve opens the fluid in the chamber 27 can now flow through the valve and into the chamber 24 from whence it can pass to the return conduit. As the member 11 is almost fully retracted the bore 32 is located to open communication between the chambers 20, 22. Hence the fluid can enter the chamber 22 to act on the piston surface 23 and cause the member 12 to move downwardly.

We claim:
1. A telescopic prop comprising:
   a. an outer prop member;
   b. an intermediate prop member disposed within said outer member for longitudinal displacement in relation thereto;
   c. a guide bushing provided with sealing and packing rings engaging on the exterior surface of the intermediate member and located at the upper end of the outer member;
   d. an inner prop member disposed within said intermediate prop member for longitudinal displacement thereto;
   e. a first piston surface formed on the intermediate member;
   f. a second piston surface formed on the inner member;
   g. a first working chamber disposed inside the outer member and open to the first piston surface;
   h. means for permitting pressure fluid to pass into or out from said first chamber;
   i. a second working chamber inside the intermediate member and open to the second piston surface;
   j. a spring-biased non-return valve operably disposed between the first and second chambers and serving to open communication between said chambers when the intermediate member is retracted within or extended from the outer member;
   k. a third chamber disposed between the outer and intermediate members;
   l. a third piston surface formed on the intermediate member and open to the third chamber;
   m. a fourth chamber disposed between the intermediate and inner members;
   n. a fourth piston surface formed on the inner member and open to the fourth chamber;

o. means for permitting pressure fluid to pass into or out from the said third chamber; and p. at least one bore in the intermediate member which permits communication between the third and fourth chambers when the intermediate member is retracted within the outer member and which permits communication between the fourth chamber and exterior of said prop when the intermediate member is extended from the outer member, an end of said at least one bore being disposed closely adjacent the lower end of said guide bushing and in communication with said third chamber when the intermediate member is fully retracted.

2. A prop according to claim 1, wherein said at least one bore in the intermediate member is inclined in relation to a diametric plane through the intermediate member.

3. A prop according to claim 2, wherein the end of said at least one bore in the intermediate member at the exterior of said member is disposed below the end of said bore at the interior of said member.

4. A prop according to claim 1, wherein said at least one bore in the intermediate member is disposed at the upper end region of the intermediate member.

5. A prop according to claim 1, wherein the guide bushing has at least one sealing ring and a wear resistant packing ring engaging on the exterior surface of the intermediate member, the packing ring being located axially inwardly of the sealing ring or of the sealing region of said ring relative to said intermediate member.

6. A prop according to claim 5, wherein the sealing and packing rings are disposed in axially spaced-apart annular grooves in the guide bushing.

7. A prop according to claim 6, wherein a resilient O-ring serves to urge the packing ring against the exterior surface of the intermediate member.

8. A prop according to claim 5, wherein the sealing ring is made from resilient material and has a sealing protruberance which engages on the exterior surface of the intermediate member and a recess which serves to receive the packing ring.

9. A prop according to claim 1, wherein a further guide bushing provided with sealing rings engaging on the exterior surface of the inner member is located at the upper end of the intermediate member.

10. A prop according to claim 9, wherein each guide bushing is detachably secured to its associated prop member and has at least one further sealing ring engaging on the interior surface of its associated prop member.

11. A prop according to claim 1, wherein the outer member is provided at the lower end with a base plate and the non-return valve has a valve closure element biased by said spring against a seating, the element being movable off its seating to open the valve to permit pressure fluid to pass between the first and second chambers when the pressure in the first chamber rises to a predetermined value and the element being connected to a stem which can engage on said base plate to move the element off its seating and open the valve when the intermediate member is retracted within the outer member to a predetermined extent.

* * * * *